(12) United States Patent
MacLean

(10) Patent No.: US 9,996,634 B2
(45) Date of Patent: Jun. 12, 2018

(54) COMPUTER-AIDED DESIGN AND MANUFACTURING SYSTEM AND METHOD FOR COMPOSITE PART MANUFACTURING METHOD AND SYSTEM

(75) Inventor: Gregory MacLean, Old Tappan, NJ (US)

(73) Assignee: Autodesk, Inc., San Rafael, CA (US)

( * ) Notice: Subject to any disclaimer, the term of this patent is extended or adjusted under 35 U.S.C. 154(b) by 233 days.

(21) Appl. No.: 13/326,298

(22) Filed: Dec. 14, 2011

(65) Prior Publication Data

US 2014/0330420 A1    Nov. 6, 2014

Related U.S. Application Data

(60) Provisional application No. 61/423,467, filed on Dec. 15, 2010.

(51) Int. Cl.
*G06Q 10/06* (2012.01)
*G06F 17/50* (2006.01)

(52) U.S. Cl.
CPC .......... *G06F 17/50* (2013.01); *G06F 2217/44* (2013.01)

(58) Field of Classification Search
CPC ...................................................... G06F 17/50
See application file for complete search history.

(56) References Cited

U.S. PATENT DOCUMENTS

| | | | | |
|---|---|---|---|---|
| 5,249,120 A | * | 9/1993 | Foley ..................... | G06Q 10/06 700/36 |
| 5,760,871 A | * | 6/1998 | Kosoburd ............. | A61F 2/1613 359/569 |
| 6,214,279 B1 | * | 4/2001 | Yang ....................... | B29C 41/52 264/308 |
| 6,233,538 B1 | * | 5/2001 | Gupta .................... | B25J 9/1666 703/6 |
| 6,799,081 B1 | * | 9/2004 | Hale ...................... | B29C 70/382 700/118 |
| 7,010,472 B1 | * | 3/2006 | Vasey-Glandon ...... | G06F 17/50 700/97 |
| 7,792,600 B2 | * | 9/2010 | Borneman .............. | F01D 5/027 345/418 |
| 8,385,587 B2 | * | 2/2013 | Debaes ................ | D03C 19/005 382/100 |
| 2002/0039603 A1 | * | 4/2002 | Gereg ................... | B30B 15/022 425/193 |
| 2002/0114537 A1 | * | 8/2002 | Sutula, Jr. .......... | G05B 19/4099 382/285 |

(Continued)

OTHER PUBLICATIONS

James Glimm†, John W. Grove‡, X. L. Li †, and D. C. Tan†, Robust Computational Algorithms for Dynamic Interface Tracking in Three Dimensions*, Electronic pub date: May 19, 2000, Los Alamos National Laboratory Report LA-UR-99-1780, pp. 2244.*

(Continued)

*Primary Examiner* — Robert Fennema
*Assistant Examiner* — Jay Jung
(74) *Attorney, Agent, or Firm* — Ohlandt, Greeley, Ruggiero & Perle, L.L.P.

(57) ABSTRACT

A system and method for designing and manufacturing of composite parts wherein the planner can design the part on a computer and analyze the entire work flow process from design to manufacture so as to determine the most efficient design and method of manufacture including resource costs including time, machines, material, labor and expenses.

20 Claims, 13 Drawing Sheets

(56) References Cited

U.S. PATENT DOCUMENTS

| | | | | |
|---|---|---|---|---|
| 2002/0181762 | A1* | 12/2002 | Silber | G06T 5/50 382/154 |
| 2002/0188622 | A1* | 12/2002 | Wallen | G05B 19/4097 |
| 2003/0219157 | A1* | 11/2003 | Koide | G06K 9/00986 382/173 |
| 2004/0078233 | A1* | 4/2004 | Abraham-Fuchs | G06Q 50/22 705/2 |
| 2004/0088577 | A1* | 5/2004 | Render | G06F 17/30864 726/25 |
| 2004/0236455 | A1* | 11/2004 | Woltman | A61F 13/15 700/132 |
| 2004/0236552 | A1* | 11/2004 | Pieper | G06F 17/5018 703/6 |
| 2005/0114107 | A1* | 5/2005 | Putnam | G06T 17/05 703/6 |
| 2005/0170379 | A1* | 8/2005 | Kita | G01N 33/6803 435/6.18 |
| 2005/0256686 | A1* | 11/2005 | Stabelfeldt | G06F 17/5018 703/6 |
| 2006/0064242 | A1* | 3/2006 | Litvack | G01C 21/203 701/410 |
| 2006/0117034 | A1* | 6/2006 | Sokolov | G06F 17/30241 |
| 2007/0106407 | A1* | 5/2007 | Drumheller | B29C 70/386 700/96 |
| 2009/0106011 | A1* | 4/2009 | Chen | G06F 8/10 703/17 |
| 2009/0271156 | A1* | 10/2009 | Kageura | G06F 17/5018 703/1 |
| 2010/0051167 | A1* | 3/2010 | Hunter | B29C 70/00 156/64 |
| 2010/0204815 | A1* | 8/2010 | Murrish | G05B 19/4097 700/98 |
| 2011/0022370 | A1* | 1/2011 | Ascenzi | G06F 19/3437 703/11 |
| 2011/0058780 | A1* | 3/2011 | Han | C03B 37/018 385/124 |
| 2011/0087350 | A1* | 4/2011 | Fogel | G06F 17/50 700/98 |
| 2011/0161054 | A1* | 6/2011 | Woolf | G06F 17/50 703/1 |
| 2012/0007839 | A1* | 1/2012 | Tsao | A61B 19/00 345/204 |
| 2012/0137243 | A1* | 5/2012 | Armstrong | G06F 17/50 715/772 |
| 2012/0316904 | A1* | 12/2012 | Eder | G06Q 10/06 705/7.11 |

OTHER PUBLICATIONS

James Glimm, John w. Grove, X. L. Li, and D.C. Tan, Robust Computational Algorithms for Dynamic Interface Tracking in Three Dimensions, Electronic pub date: May 19, 2000, Loa Alamos National Laboratory Report LA-UR-99-1780, pp. 2244.*

MATLAB, "Regridding: from fine grid to coarse grid", Jun. 21, 2006, MATHWORKS.com, <http://www.mathworks.com/matlabcentral/newsreader/view_thread/127009>.*

* cited by examiner

COMPUTER-AIDED DESIGN AND MANUFACTURING SYSTEM AND METHOD FOR COMPOSITE PART MANUFACTURING METHOD AND SYSTEM

CROSS REFERENCES TO RELATED APPLICATIONS

This non-provisional patent application claims a priority benefit to U.S. Provisional Application No. 61/423,467 entitled "COMPOSITE PART MANUFACTURING METHOD AND SYSTEM" filed in the United States Patent and Trademark Office on Dec. 15, 2010 by a common Inventor to this instant application, Gregory MacLean. Further the above named Provisional Application is hereby incorporated by reference.

STATEMENT REGARDING FEDERALLY SPONSORED RESEARCH

Not Applicable

REFERENCE TO APPENDIX

Not Applicable

FIELD OF THE INVENTION

This invention relates to the computer aided design and manufacturing of composite parts and strategies to minimize resource costs and maximize production and reliability.

BRIEF SUMMARY OF THE INVENTION

This invention is a system and method for the design and manufacture of composite parts.

DESCRIPTION OF THE INVENTION

1 Overview

This document outlines the preliminary functional requirements for TruPLAN for Conceptual Design, which contains the tools integrated into the conceptual design process for composite parts. The goal of this document is to describe the basis for the features being described and to present the solution proposed for TruPLAN.

1.1 Product Overview

TruPLAN is an application that provides design, manufacturing, analysis and planning features for composite parts from the early stage of conceptual design to the final detail design specifications. These features make it easier to understand the impact of design decisions on potential manufacturing processes, allowing decisions to be made about how composite parts are manufactured early in the design process. With the improved infrastructure available in CAD/CAM platforms, it is possible to include manufacturing analyses in the conceptual design stage, making it possible to consider the manufacturability of a part from the earliest stages of development.

2 Overall Process Flow

Figure 1:
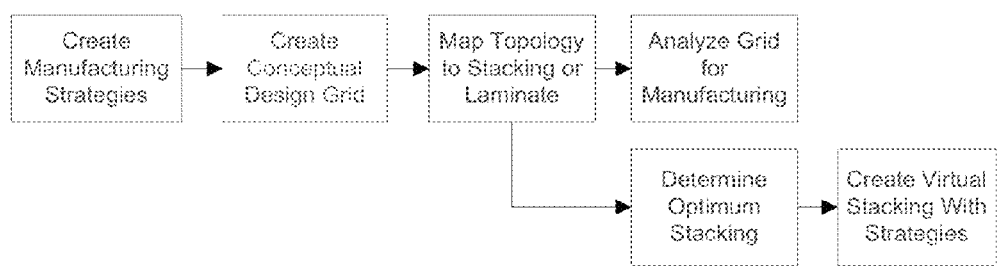
FIG. 1 shows the overall conceptual design process.

The highest level of the process for defining the manufacturing strategies for the stacking of a composite part is shown in FIG. 1. In particular, the portions of this process are as follows:

Create Manufacturing Strategies: This process involves the user analyzing the topology and using this information to both automatically and manually define the manufacturing topology regions and the associated strategies that are best for the part.

Create Conceptual Grid: This functionality is already provided by composites design products embedded into most CAD environments.

Map Topology to Stacking or Laminate: This functionality links the manufacturing strategy analysis information to the conceptual grid definition. There may be one or multiple surfaces that are analyzed for manufacturing constraints, and this is where those surfaces are linked to the corresponding portions of the conceptual design grid.

Analyze Grid for Manufacturing: This functionality allows the user to perform preliminary analysis of design impacts on manufacturing. This allows the user to see ahead of time what portions of the design require the most for manufacturing and to analyze the costs (time and money).

Determine Optimum Stacking: This functionality provides the user with tools to determine the optimum stacking based on manufacturing constraints. Once the best manufacturing strategies have been determined for the different orientations of the material, all of the necessary information exists to determine which ply shapes yield the best manufacturing results.

Create Virtual Stacking with Strategies: This functionality is the tail-end of the previous step and allows for the optimum stacking to be fully defined as virtual plies that also include the full description of the manufacturing strategy.

Each of these different steps in the process requires different functionalities described in the sections below. Regardless of the functionalities, a common approach is used in each of these steps: allow the user to make an educated decision or use automation where possible, provide the user with all of the possible analysis information such that they can make the best decisions and verify any automated calculations, and provide a historical representation of the design process for review and adjustment.

3 Manufacturing Strategy Optimization

Figure 2:
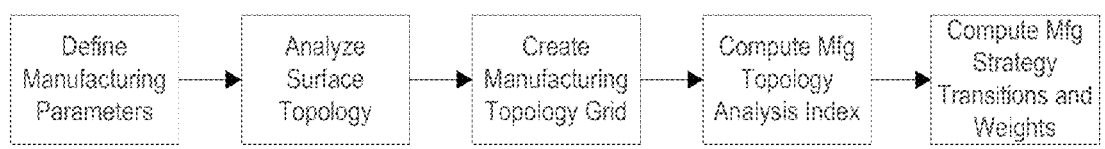
FIG. 2 shows the process for creating manufacturing strategies.

The process of determining the manufacturing strategies for a given topology is the most complicated of all processes, in that there are many steps involved. The high-level process flow for creating the manufacturing strategies is shown in FIG. 2. The steps in this process are as follows:

Define Manufacturing Parameters: This step in the process involves defining the manufacturing strategies that may be used to manufacture the part.

Analyze Surface Topology: During this stage, functionality is provided for the user to analyze the surface topology for effects on manufacturing. The analyses incorporate the manufacturing parameters defined in the previous step and allow the user to see the effects of surface design on manufacturing.

Create Manufacturing Topology Grid: This step creates the grid that will be used to structure the analysis results on the surface. During this step in the process, the user is given the ability to see different analyses of the topology to aid them in creating the grid.

Compute Mfg Topology Analysis Index: This step associates results of one or more topology analyses to individual cells of the grid defined in the previous step. This information can then be browsed by the user in a manner similar to finite element analysis systems.

Compute Mfg Strategy Transitions and Weights: This step computes the weights and transition regions that will be used to create manufacturing strategies for plies later. This process makes it possible to compute the manufacturing strategy region boundaries and to determine the optimal strategy to use for each ply at the ply creation stage.

These steps essentially segregate the process down into individual groupings of features that comprise the overall process of determining the optimum manufacturing strategies. The sections below outline specific portions of this process in detail, including user interaction, and use cases.

3.1 Manufacturing Parameters and Manufacturing Topology Analysis

Surface design and creation is the first step in the design process for a composite part. The topology of the surface that represents the composite part has a very high impact on the manufacturability of the part. Different composites manufacturing processes are more sensitive to different surface features, such as concave radii for automated fiber placement and automated tape laying manufacturing processes.

Figure 3:
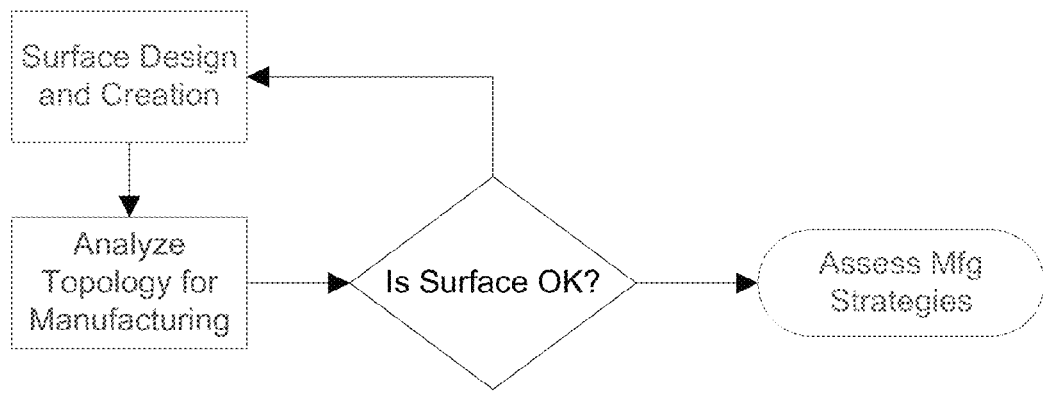
FIG. 3 shows the manufacturing topology analysis process.

The overall process flow required to account for manufacturing constraints at the earliest stage possible is shown in FIG. 3. This process involves checking surface topology for manufacturing problems before any other decisions are made. This ensures that the surface has the right qualities for the desired manufacturing strategies as early in the process as possible, before assessing manufacturing strategies based on the topology. This situation ultimately involves two separate areas where decisions can be made by the user.

Figure 4:
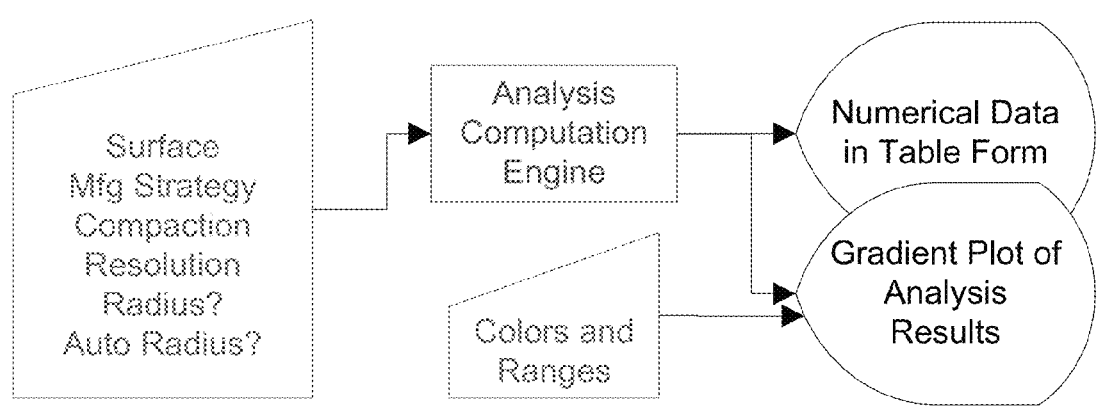
FIG. 4 shows the manufacturing topology analysis user interaction.

In order to address these separate areas where the user can make decisions, TruPLAN provides user interaction with the analysis features as shown in FIG. 4. The user interaction is designed to allow the user to modify or define both the surface and the manufacturing strategies at the same time. The key is the input to the analysis computation engine, which is as follows:

Surface: The surface whose topology is being analyzed, which is acquired through user selection.

Mfg Strategy: The manufacturing strategy to analyze on the topology, which is defined by the user through the user interface.

Compaction: The compressibility of the compaction of the roller, which is provided by the user in the dialog.

Resolution: The density of the calculations, which is defined by the user in the dialog. This value ultimately controls how fine-grained the results are.

Radius: An optional parameter specifying the minimum radius of the surface. The user can specify this radius to check to see whether they would have manufacturing problems should they modify the surface to have this minimum radius. This value is defined by the user in the dialog.

Auto Radius: Optional parameters that allow the analysis engine to determine the minimum radius of curvature that is required to meet the analysis tolerances. These options consist of an option to control how the minimum radius is calculated as well as the analysis tolerances that must be met. Both of these types of parameters are defined by the user in the dialog.

This user interaction makes it possible for the user to both analyze the feasibility of certain manufacturing strategies as well as surface topology changes. These two use cases are described in the following sections.

3.1.1 Use Case 1—Analyzing Surface Topology

Figure 5:
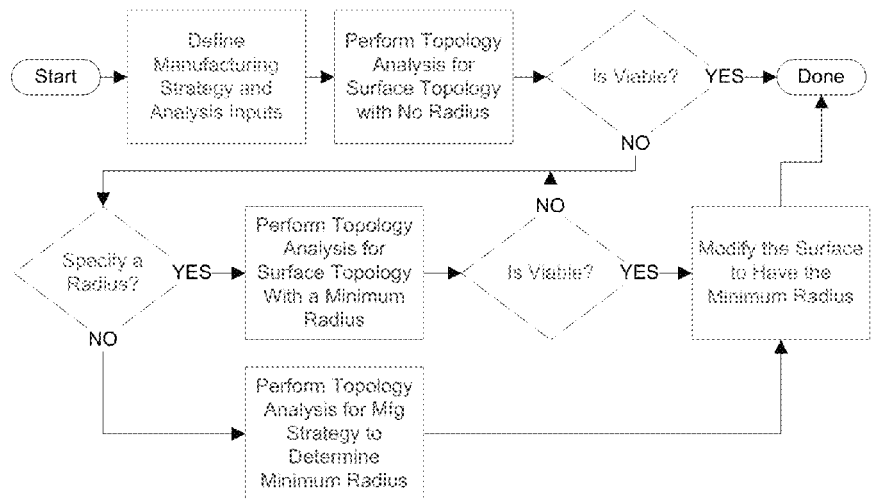
FIG. 5 shows a user interaction model of surface topology analysis.

This use case covers the situation where the user is either interested in determining the manufacturing feasibility of a composite part given a surface or has a surface that can be changed to meet requirements of manufacturing. An example of this situation would be one where the surface represents the portion of a part where the core has been placed. In this situation, the core could have the radii increased to ease issues with manufacturing when traversing the ramps of the core. The user interaction that models this use case is as shown in FIG. 5. In this user interaction model, the user can define one or more manufacturing strategies along with the analysis inputs and run the analysis on the surface topology. If the surface is not viable for that manufacturing strategy, the user has a couple of options: specify a minimum radius to use to adjust the surface so that the manufacturing strategy can be used or allow the analysis engine to determine the minimum radius needed to make the manufacturing strategy viable.

The user may want to define a radius in the case that there are pre-made core models that already have a radius or there are certain design constraints that require a specific radius to be located in the part. This functionality essentially allows the user to keep trying different radii and/or manufacturing strategies in a loop until a combination is found that is viable.

If the surface can be modified to have any sort of radius added to corners, then the analysis engine is capable of computing the minimum radius required to make the given manufacturing strategy viable according to some constraints as shown in FIG. 4 and described in Section 3.1 above. This functionality makes it possible to tailor the geometry to fully meet manufacturing requirements. For instance, if the user wants to use a 4 inch band width for fiber placement to manufacture a part, this functionality will tell them how much of a radius is needed to make this possible without problems.

3.1.2 Use Case 2—Analyzing Manufacturing Strategy Viability

Figure 6:
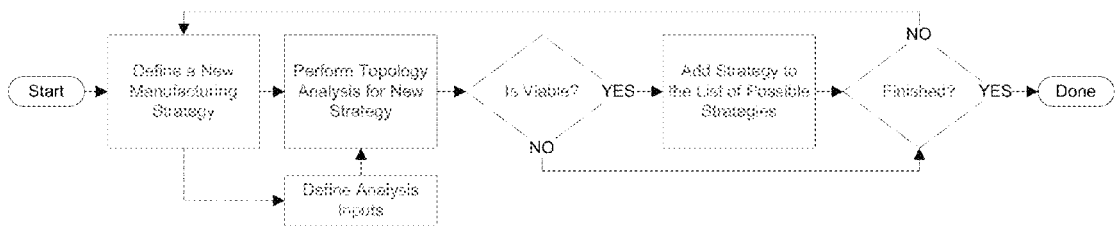
FIG. 6 shows a model of manufacturing strategy creation.

In the cases where the user cannot change the surface (for instance, the surface is the aerodynamic surface of an aircraft part that cannot change) or the surface is good enough for the desired manufacturing strategies, the user would interact with the features as shown in FIG. 6. The user can check the viability of each manufacturing strategy as it is being created. First, the user defines a manufacturing strategy along with analysis inputs if they are not already defined. Then the analysis engine computes results for the user to interact with in the manner shown in FIG. 4 through the display of gradient color information and a table of data. Finally, the user makes the decision based on this data as to whether the manufacturing strategy is viable to consider for the part. Note that at this stage, the user is not making the decision about what specific manufacturing strategy to use, but rather is making the decision about what possible manufacturing strategies could be used later. At the end of this use case, the user is ready to continue on to the remaining process defined in the following sections.

3.2 Manufacturing Topology Grid

Figure 7:
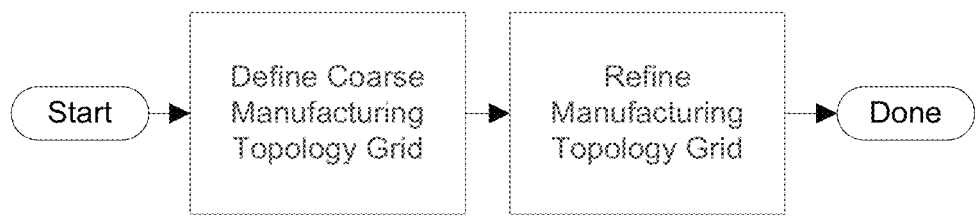
FIG. 7 shows a manufacturing topology grid creation process.

The manufacturing topology grid makes it possible for TruPLAN to provide an analysis structure similar to that of finite element analysis systems. The purpose of the grid is to provide a geometric basis for the geometry that will eventually represent the manufacturing strategy regions and to discretize the analysis results such that the results can be organized and easily used by both the user and the optimization algorithms used by TruPLAN to automate portions of the process. The process of creating the manufacturing grid is shown in FIG. 7 and consists of two steps: creating the coarse grid following the surface topology and refining the grid to the desired resolution. The following sections detail the processes of creating the coarse manufacturing topology grid and refining the manufacturing topology grid.

3.2.1 Coarse Manufacturing Topology Grid

The coarse grid is used to shape the grid to conform to surface features. Ultimately, the goal is to have the shape of the coarse grid resemble the shapes of the deformation areas of the surface. If the grid is shaped in this manner, then TruPLAN can better understand where the problem areas occur and can create geometry for the manufacturing strategy regions that more accurately highlights the areas of the surface that need to be differentiated with regard to manufacturing strategies.

Figure 8:
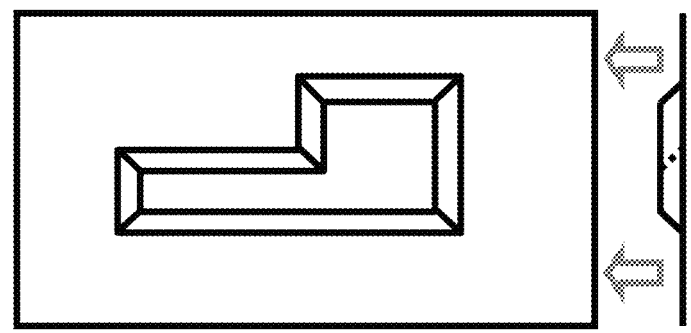
FIG. 8 shows an example surface for a coarse grid.
Figure 9:
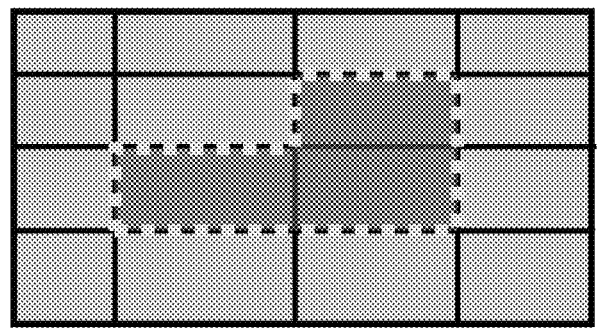
FIG. 9 shows the different topological areas of a coarse grid.
Figure 10:
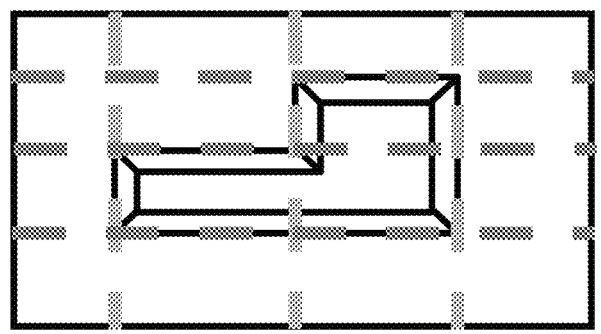
FIG. 10 is an example of a coarse grid.

The surface shown in FIG. 8 is a good example of a surface that would benefit from a well-defined coarse grid. The surface represents a common situation found in composite parts: a smooth surface with a core attached. The core has a ramp, which is the source of many of the manufacturing issues and should drive the creation of the coarse grid. The coarse grid is composed of two sets of grid contours representing the horizontal and vertical divisions of the grid. If the coarse grid follows the ramp, then the division of the surface allows for TruPLAN and the user to consider the parts of the ramp separately from the rest of the smooth surface. Areas of the surface that are smooth have better manufacturing properties than areas with ramps. With this in mind, the coarse grid for this surface would be created by the user to resemble the grid shown in FIG. 10. In this example, the grid is tied to the bottoms of the ramps of the core. This makes it possible to identify the different topological areas of the part easily as shown in FIG. 9, where the blue area is flat and the red area contains the portions of the topology with complex surface structures that will have large impacts on manufacturing strategy viability.

This example surface is quite easy for the user to determine a good location of the grid contours, however TruPLAN also provides tools for the user to make these decisions for surfaces that are not so easy to understand. For the surface shown in FIG. 8, the user would be able to display gradient plots of analysis results in order to help them identify where problem areas may be. In this particular case, the display of the bridging analysis for a 45-degree constant angle strategy for fiber placement would yield a display similar to that shown in FIG. 11. Using this information, it would then be clear to the user that the bottoms of the ramps are good locations for coarse grid contours.

3.2.2 Manufacturing Topology Grid Refinement

The refined grid is used to make the discretization of the manufacturing analyses more granular in order to allow manufacturing analysis results to be used to represent smaller portions of the surface. The refined grid makes it possible for analysis results to be associated to the refined grid cells independently, which provides a discrete model that is capable of approximating any shape of boundary on the surface without re-computing all of the analysis data. This greatly reduces computation time and allows for more powerful functionality described later in this document which requires many different combinations of cells to be considered.

Figure 12:
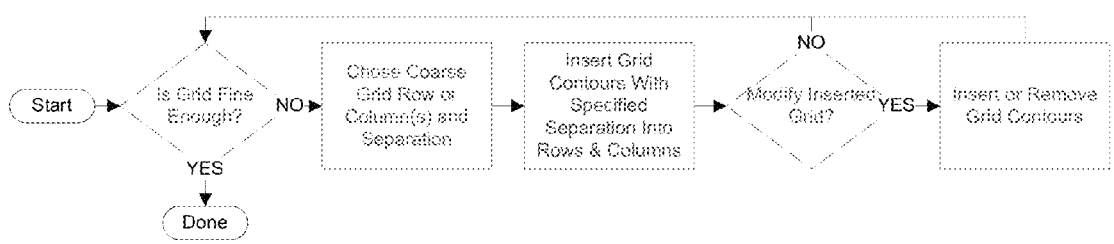
FIG. 12 shows a manufacturing grid refinement process.

The grid cell refinement process is simple and is shown in FIG. 12 and is mostly driven by automatic filling mechanisms that fill in the coarse grid with grid contours that have a maximum separation specified by the user. TruPLAN then inserts grid contours into the grid to meet the desired size for the user.

Figure 11:
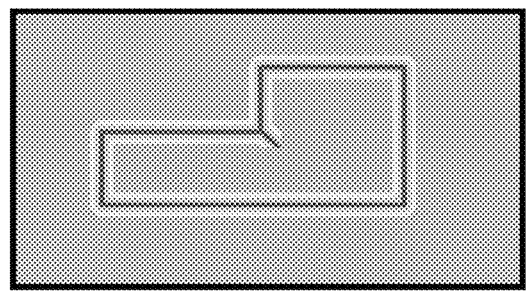
FIG. 11 shows an example bridging analysis display for coarse grid creation.
Figure 13:
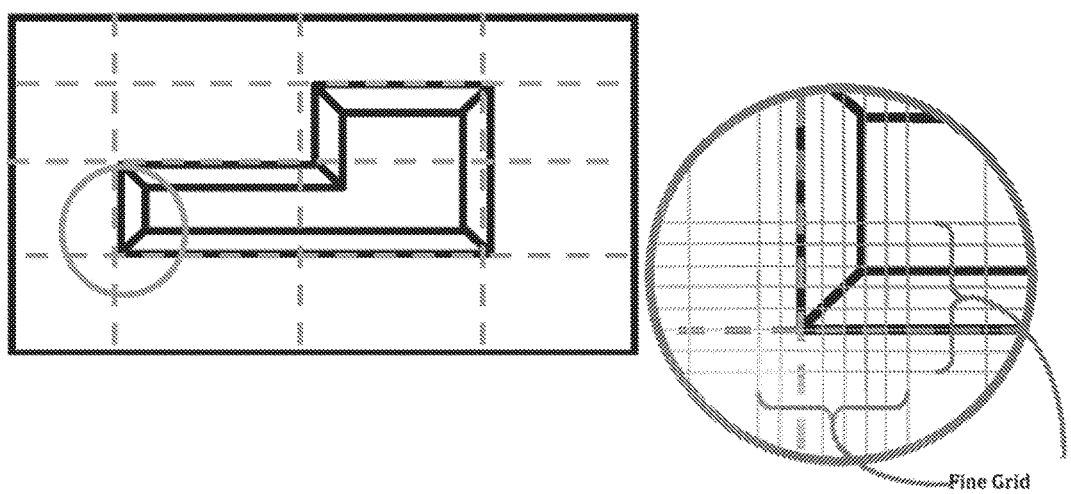
FIG. 13 shows an example manufacturing grid refinement.

The user may also decide to refine the grid manually by inserting or removing grid contours. This could be useful in situations where the grid only needs to be dense in portions of the surface and not in others. The surface shown in the previous section in FIG. 8 is a good example of a case where the user would want to refine the grid by inserting or removing grid contours. The problems for manufacturing are mainly going to be seen near the ramps of the core as indicated in FIG. 11. Given that the user needs to make a decision based on analysis results, similar functionality as is available during the coarse grid creation must be available to the user in this step as well so that they can make a good decision about where the grid can be coarse and where it can be fine. The goal is to focus the refinement of the grid on areas where the manufacturing strategies have difficulties as shown in FIG. 13.

3.3 Manufacturing Topology Analysis Index Matrix

The manufacturing topology analysis index matrix is responsible for storing all of the analysis results for all of the manufacturing strategies for each cell in the refined manufacturing topology grid. At this stage in the process, all of the manufacturing strategies have been defined. However, the analyses that have been run have been "quick" analyses that did not have all of the necessary inputs in order to be as accurate as they could be at this point.

Figure 14:
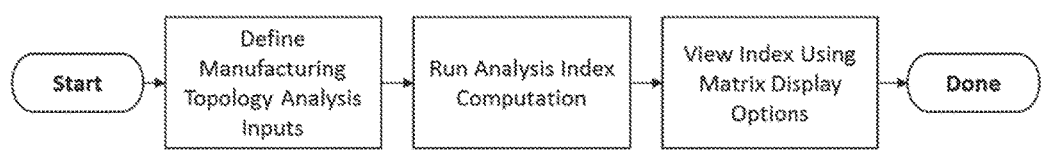
FIG. 14 shows a manufacturing topology analysis index matrix process.

The process for defining the manufacturing topology analysis index matrix is shown in FIG. 14 and is composed of these steps:
  Define Manufacturing Topology Analysis Inputs: This step requires that the user define the manufacturing topology analyses that are to be computed for the index matrix as well as their inputs. The analyses that can be computed for the matrix are:
    Angle Deviation: The deviation between the theoretical and actual fiber orientation.
    Steering: The steering radius of the material.
    Bridging: Amount of bridging encountered due to topology.
    Time: The estimated layup time, which represents the estimated amount of time required to lay material in the given area. Note that due to the limitations on data available, this value is computed against the coarse grid and then averaged across the refined cells in the coarse grid cells.
  Each of these analysis results is represented as a single numerical value that is associated to each refined grid cell.
  Run Analysis Index Computation: This stage of the process is where TruPLAN uses all of the inputs for the analyses (i.e. the analyses mentioned previously, the manufacturing strategies, and the grid) to compute the analysis index values for each grid cell. Due to the sheer amount of information that is computed in this stage and the potentially large computation time, TruPLAN provides the user with the ability to compute this information interactively or in batch mode. The interactive mode of computing analysis index values provides the user with progress information and the ability to cancel the computation. The batch mode allows the user to spawn a batch process outside the interactive session that computes the results. The results can then be associated to the manufacturing topology grid when the batch mode computation is complete.
  View Index Using Matrix Display Options: After the results of the manufacturing topology analyses have been computed for each of the manufacturing strategies and the index matrix built, the results can be displayed through different visualization options for the index matrix object that allows the user to display the results by analysis and manufacturing strategy through gradient plots and tables.

3.4 Manufacturing Strategy Transitions and Weights

This stage in the process computes the manufacturing strategy transitions and weights. The data computed by TruPLAN in this stage makes it possible for the optimum manufacturing strategy for a ply to be easily and quickly computed later. Essentially, this process serves the purpose of computing all of the data that could possibly be used by any algorithm that needs to compute the most optimal strategy for a ply.

The approach to preparing this data for later use is to associate the data to the coarse manufacturing grid. The coarse manufacturing grid has a unique ability to conform to different topological features of the manufacturing surface, making it possible for the optimization data computed in this stage to be associated to topological regions of the surface. The result is that optimization data is stored individually for areas of the surface that have different topological features.

The data associated to each cell of the coarse manufacturing topology grid must be useful to compute a wide variety of complex manufacturing strategies. One of the most powerful features of TruPLAN is the support for multiple propagation modes in the manufacturing strategy for one ply. This is accomplished through interpolation regions that make it possible to connect between two different areas manufactured with two different propagation modes. Due to varying effects of topological features on manufacturability, it may be possible for one propagation mode to be used in one area of the surface, and a completely different propagation mode to be used in a different area of the surface.

Figure 15:
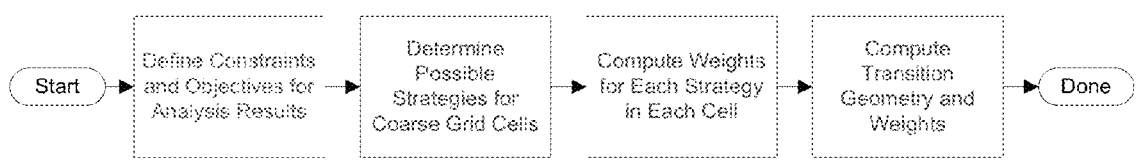
FIG. 15 shows a manufacturing strategy transition and weight process.

The process for computing this information is shown in FIG. 15 and is optimized to compute the information in the quickest and easiest way possible. First, the user defines constraints and weights for the optimization engine. The constraints are used to determine which manufacturing strategies can be used for each cell. Then the optimization engine determines the weight for each manufacturing strategy for each cell, which can be used by downstream processes to combine strategies into the best overall strategy. Finally the transition regions are computed for each neighboring cell and transition between manufacturing strategies.

Figure 16:
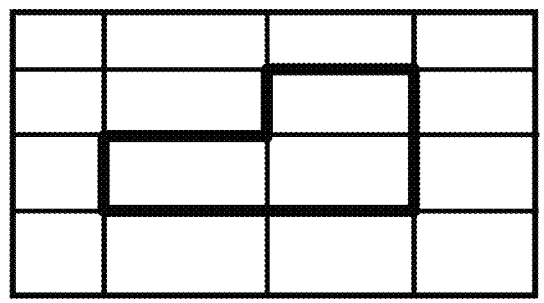
FIG. 16 shows an example coarse grid.

An illustration of a hypothetical example shows the true power of this process on the design of manufacturing strategies for composites. Considering the surface shown in the previous section in FIG. 8, a coarse grid such as the one shown in FIG. 16 would be used for this process. This coarse grid is the product of the previous steps in the process described in Section 3.2.1.

Figure 17:
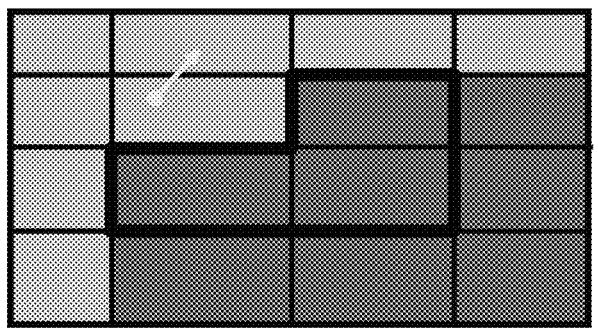
FIG. 17 shows an example of valid cells for a manufacturing strategy.
Figure 18:
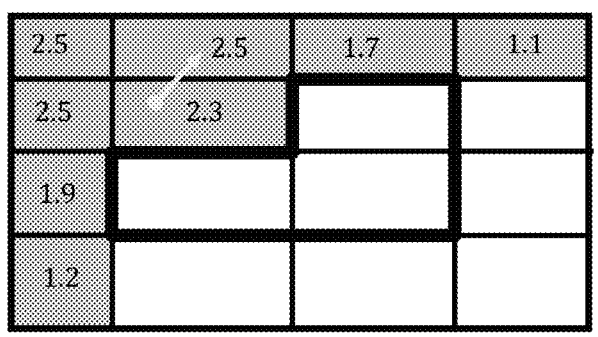
FIG. 18 shows example weights for a manufacturing strategy.

After the user has supplied the objectives and constraints for the optimization engine, TruPLAN determines the possible strategies for the coarse grid cells. An example of the result of this step is shown in FIG. 17. This example shows the cells that would be valid in a hypothetical situation where constant angle offset is used for the start point and angle shown by the white arrow. The result is the light cells are cells where the strategy is possible to use and the dark cells are where the strategy is not possible to use given the constraints supplied by the user The next step in the process is the computation of the weights for each manufacturing strategy in each grid cell as shown in FIG. 18. This weight is used by the optimization algorithms later in the design process to make decisions about which manufacturing strategy to use in each grid cell. This weight is applied to the grid cell and is computed using the objectives supplied by the user under the assumption that the manufacturing strategy is used to manufacture a ply that covers just the grid cell itself. At this stage, there is no consideration for the transition between one cell and the next.

Figure 19:
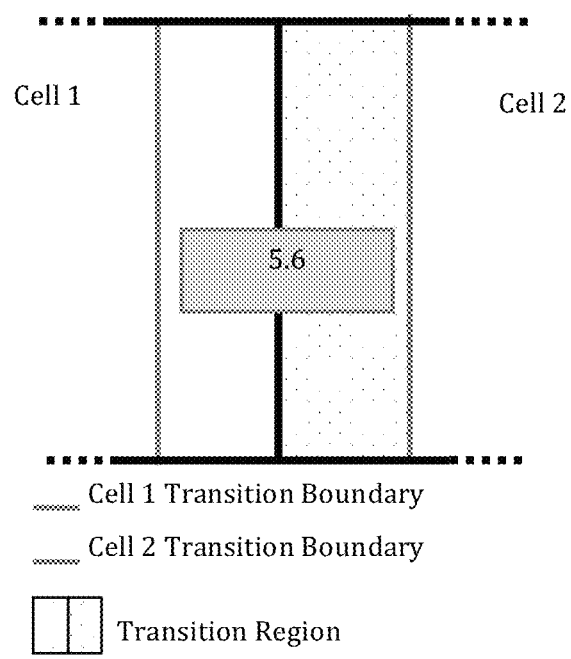
FIG. 19 shows an example transition region definition.

Once the manufacturing strategies are analyzed for each cell and the weights computed, the next step is to analyze the transitions between different strategies in adjacent cells. For each transition from one strategy to a different strategy on each side of each cell of the coarse grid, two pieces of information are computed: the curve that defines the transition region between the cell and the adjacent cell and the weight of the transition. An illustration of the data that is computed is shown in FIG. 19. The boundary runs roughly parallel to the edge of the cell and is used in later processes to define the sector regions that comprise the overall manufacturing strategy. The weights are used to account for the interpolation between two adjacent strategies. Essentially, where there is a weight for each cell independently, this weight accounts for the transition between strategies in adjacent cells. Between the two weights, optimization algorithms can make an accurate decision about the optimal process definition.

Figure 20:
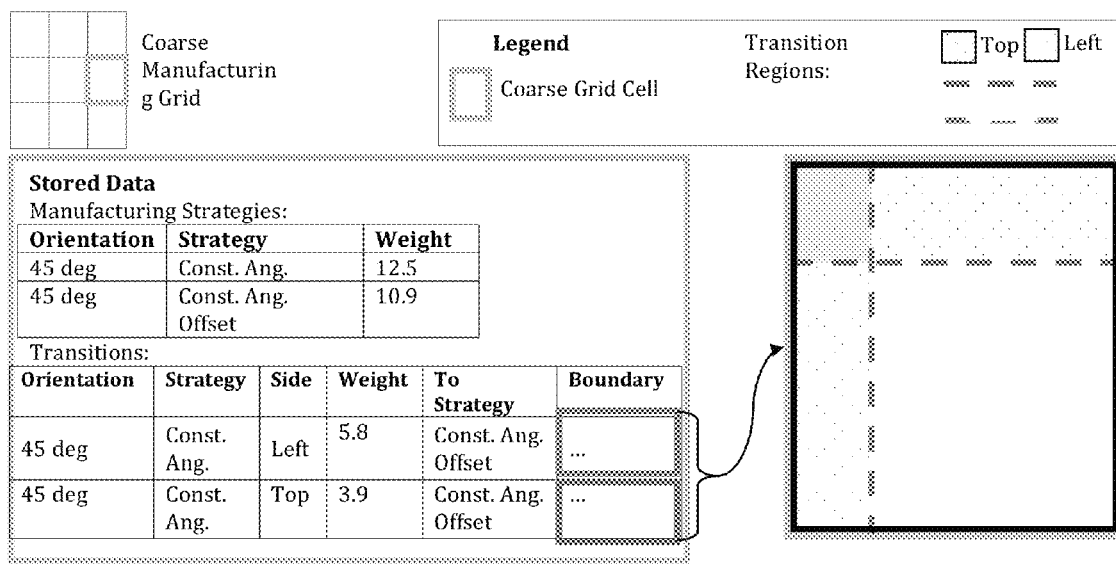
FIG. 20 shows a summary of data stored for each coarse grid cell.

All of the information computed in this step serves one purpose: to make it quick and easy for downstream code to compute manufacturing strategies. A summary of the information stored during this process is shown in FIG. 20. With the information shown here, any optimization process can quickly determine what the most efficient manufacturing strategy is for a given ply boundary.

Figure 21:
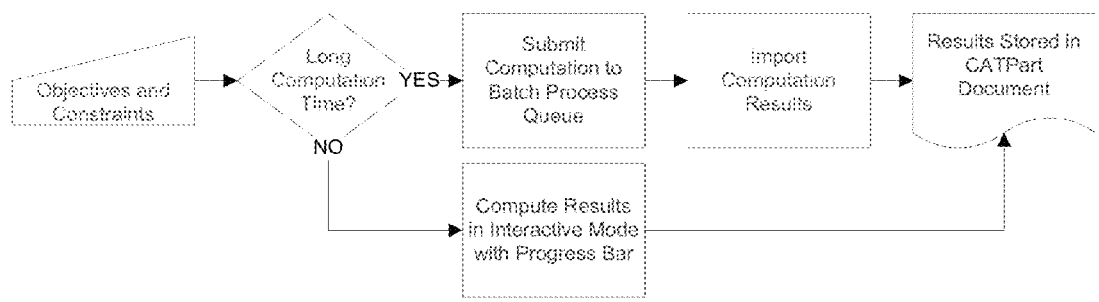
FIG. 21 shows a manufacturing strategy transition and weight user interaction.

The user interaction for this functionality can follow one of two possible styles: interactive or batch mode. The user interaction is shown in FIG. 21 and shows the two use scenarios. The user is responsible for supplying the objectives and constraints for the optimization engine to compute the weights previously described in this section. Depending on the part, computation time can be quite lengthy, so TruPLAN allows the user to execute the computation of this information in batch mode, allowing them to continue using CATIA while the results are being computed. Once the computation process is completed, the user can import the computed results. If the computation will not take long to run, the user can simply run the computation in interactive mode where a progress bar is shown. This can be canceled by the user, allowing them to re-run the computation in batch mode should the user discover that computation time is long. In either case, the results are stored in the CATPart document as standard features.

Another important set of features provide the user with the ability to interact with and modify the results. In order to understand the results, the user is given tools to allow them to see interactively what the results of the computation were. This functionality is provided through a mechanism to display the information in the 3D viewer, allowing the user to interact with the results graphically through the coarse grid cells, as well as in tabular form, allowing the user to filter and sort information. Through these mechanisms, it is possible for the user to quickly and easily understand what the strategies, weights, and transitions are for each cell.

Along with the tools to inspect the results, the user is given the ability to change these results. The modifications allowed by TruPLAN are:
  Remove strategies altogether.
  Adjust weights for both strategies in cells and transitions.
  Insert strategies and apply weights.
  Remove transitions (preventing the transitions from being possible).
  Insert transitions (allowing transitions between cells containing the same manufacturing strategy).
  Modify transition region border geometry.

The strategy exhibited by TruPLAN in this functionality is to provide the user with all of the tools to manually create this information and to correct any issues overlooked by the optimization engine.

The final set of functionality that completes the user interaction with the results allow the user to preview how the manufacturing strategies will be chosen given the results. Downstream processes will ultimately be using these results to determine the best manufacturing strategy to use for a particular ply. This is done by considering the coarse manufacturing topology grid cells that completely contain the ply boundary and by considering all of those cells as a whole using the weights calculated in this step in the process. The functionality available here, mimics this process by allowing the user to select a set of coarse manufacturing topology grid cells representing a test ply and viewing the manufacturing strategy that results from that grouping of cells in the form of displaying the fiber simulation as well as providing analysis results for the user. This functionality effectively allows the user to accurately predict what manufacturing strategies will be created by the engine for plies that cover the same manufacturing zones later on.

4 Ply Manufacturing Strategies

Figure 22:
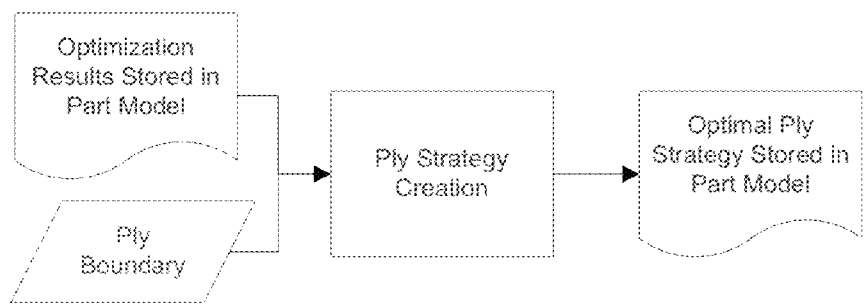
FIG. 22 shows a ply manufacturing strategy creation user interaction.

This step in the overall process is where the optimization information produced in Section 3.4 is used to define the manufacturing strategy for a given ply. The goal of producing the information that is described in Section 3.4 is to provide enough information for the processes at this stage to be able to quickly determine the manufacturing strategy for a ply. The user interaction for this part of the process is shown in FIG. 22. The user interaction is very minimal at this point, which is the desired reaction. The process should be able to automatically determine the best manufacturing process very quickly and easily given the information computed and defined in earlier stages in the process.

Figure 23:
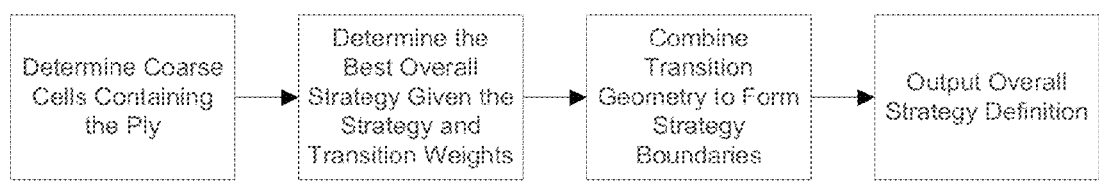
FIG. 23 shows a ply manufacturing strategy creation process.
Figure 24:
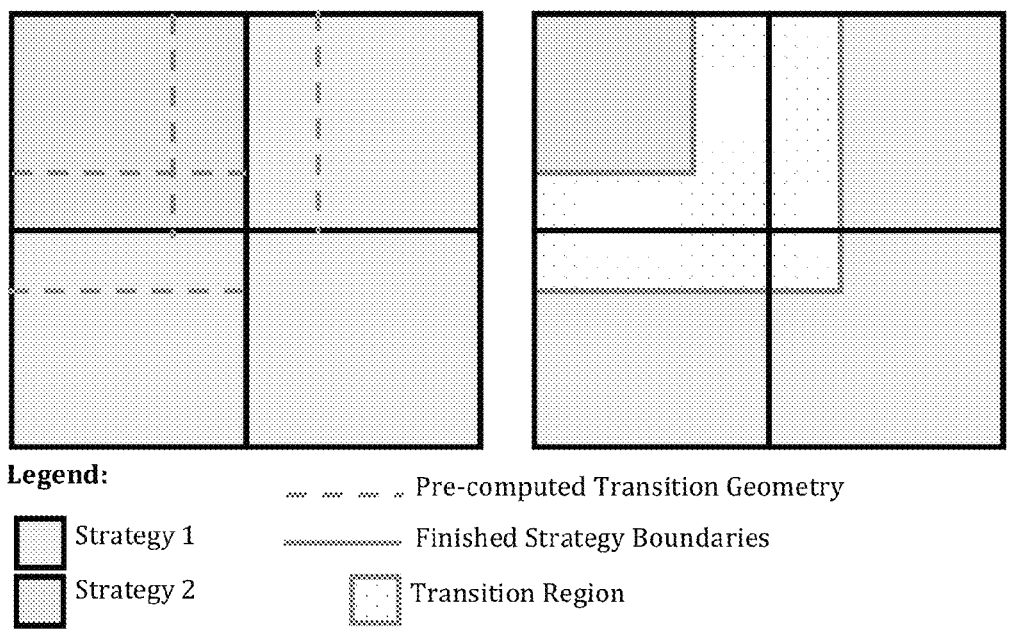
FIG. 24 shows an example transition geometry computation.

The process that TruPLAN uses to determine this strategy is shown in FIG. 23. The steps in the process are:
  Determine Coarse Cells Containing the Ply: This stage in the process narrows down the groups of coarse manufacturing topology grid cells that contain the ply. Only these cells will be considered by the rest of the process, allowing for a manufacturing strategy that is based solely on the areas of the surface that the ply actually resides in.
  Determine the Best Overall Strategy Given the Strategy and
  Transition Weights: This stage of the process uses the weights stored on the cells for each strategy and transition to determine the best process to use in each cell. This algorithm accounts for both the effectiveness of the strategy in each cell, as well as any transitions that may occur between the cell and its neighbors, by considering the weights that have already been computed for each strategy per cell and for each transition between each strategy in neighboring cells.
  Combine Transition Geometry to Form Strategy Boundaries: Once the strategy is determined for each cell, TruPLAN generates the geometry that represents the boundary for the manufacturing strategies. For neighboring cells that have transitions, the boundaries are already computed. TruPLAN only needs to compute any blending between the boundaries that have already been computed such as those shown in FIG. 24.
  Output Overall Strategy Definition: The overall strategy definition consists of the manufacturing strategy and the boundary enclosing the area where the manufacturing strategy is used. At this point in the process, all of this information has been computed. TruPLAN creates the overall strategy in the part model and associates it with the ply definition.

I claim:

1. A method for computer aided design and manufacturing (CAD/CAM) a composite part comprising:
  generating, using a CAD/CAM computing device, at least one manufacturing strategy for at least one associated topology region of the composite part, the generating comprising:
    defining one or more manufacturing parameters;
    analyzing the surface topology for the at least one composite part surface using the one or more manufacturing parameter definitions;
    creating a manufacturing topology grid for the composite part;
    associating at least one manufacturing topology analysis to a plurality of individual cells of the manufacturing topology grid;

computing weights for each of the plurality of individual cells of the manufacturing topology grid for a plurality of manufacturing strategies for a ply of a composite part, and computing, using the CAD/CAM computing device,
a manufacturing topology analysis index by associating one or more of the topology analyses to the plurality of the individual cells of the manufacturing topology grid, and
transition regions for neighboring cells of the plurality of individual cells for transition between the manufacturing strategies;

outputting a strategy definition including the at least one manufacturing strategy to a downstream device configured for composite part manufacture;

manufacturing the composite part based on the manufacturing strategy.

2. A method as in claim 1 wherein the generating at least one manufacturing strategy further comprises:
creating the manufacturing topology grid, the creation of the manufacturing topology grid comprising presenting a user with a plurality of differing topology analyses; and.

3. A method as in claim 1 and further comprising:
presenting a user with an interface configured to present selectable parameter definitions an analysis engine,
creating a surface topology for the at least one composite part with the analysis engine from using the selected parameter definitions; and
determining the manufacturing strategy by analyzing the defined surface topology presenting a manufacturing strategy analysis based on the selected parameters and the surface topology of the part.

4. A method as in claim 1 wherein creating the manufacturing topology grid comprises:
computing a coarse manufacturing topology grid for the composite part surface;
analyzing the grid to determine if the grid is fine enough for a selected manufacturing strategy; and
refining the grid to meet resolution requirements of the selected manufacturing strategy.

5. The method of claim 1, further comprising:
analyzing the topology grid to perform a preliminary manufacturing design impact analysis.

6. The method of claim 1, further comprising:
determining an optimum composite part ply stacking strategy based on the manufacturing strategy analysis, the ply stacking strategy including an optimum ply shape analysis; and
creating a virtual stacking analysis including the optimum ply stacking strategy.

7. The method of claim 3 wherein the parameter inputs include parameter inputs selected from:
the surface;
the manufacturing strategy;
the compressibility of the compaction of the roller;
the density of the calculations;
a minimum radius of the surface.

8. The method of claim 7 wherein the parameter input further comprises a minimum radius of curvature for analysis tolerances.

9. The method of claim 1 further comprising:
the computing comprising computing a shape of the manufacturing topology grid for the composite part surface that resembles a shape of deformation areas of the surface; and creating a geometry for the manufacturing strategy regions that identifies one or more areas of a composite part surface to be differentiated with regard to a plurality of the manufacturing strategies.

10. The method of claim 4 wherein the grid refinement comprises:
selecting at least one row or at least one column of the grid and a separation;
inserting one or more gird contours with the selected separation into the row or column; and
modifying the grid insert.

11. The method of claim 2 wherein method further comprises:
computing analysis index values for each grid cell of the manufacturing topology grid with the manufacturing topology analysis index.

12. The method of claim 11 wherein the inputs for defining the manufacturing topology analysis index include:
calculating an angle deviation between a theoretical fiber orientation and an actual fiber orientation;
calculating a steering radius of a fiber material;
determining an amount of bridging encountered due to the topology; and
determining an estimated layup time.

13. The method of claim 1 wherein the method comprises:
defining constraints and weights for an optimization engine, the constraints being configured to determine a manufacturing strategy for a cell of the grid;
computing transition regions for adjacent cells of the grid, at least one transition region including a transition between manufacturing strategies.

14. The method of claim 13, wherein the method comprises identifying valid and invalid cells of the grid for a manufacturing strategy using the defined constraints.

15. The method of claim 13, wherein the method comprises: computing the weights for each manufacturing strategy for each grid cell.

16. The method of claim 15, wherein the method comprises analyzing the transitions between the strategies in adjacent cells.

17. The method of claim 16, wherein the method comprises, for each transition from one strategy to a different strategy on each side of each adjacent cell of the grid:
computing a line defining a transition region between the cell and the adjacent cell; and
computing the weight of the transition region using the weights of the cell and the adjacent cell.

18. The method of claim 17 wherein the method comprises,
storing the computed data for use by the optimization engine,
computing an optimal manufacturing strategy for a ply boundary.

19. The method of claim 18 wherein the method comprises,
providing the information to a graphical user interface configured to allow a user modify the data.

20. The method of claim 17, wherein method comprises:
determining the cells of the coarse grid containing the ply boundary;
determining the optimum strategy for each cell using the cell strategy weights and the transition weights;
generating a geometry representing the ply boundary for the manufacturing strategy;

outputting an overall strategy definition including the manufacturing strategy and the boundary area for the manufacturing strategy.

\* \* \* \* \*